M. BICHEROUX.
METHOD OF AND APPARATUS FOR CUTTING PLATE GLASS.
APPLICATION FILED JULY 25, 1912.

1,114,098.  Patented Oct. 20, 1914.

UNITED STATES PATENT OFFICE.

MAX BICHEROUX, OF HERZOGENRATH, GERMANY, ASSIGNOR TO BICHEROUX, LAMBOTTE AND CIE., GESELLSCHAFT MIT BESCHRANKTER HAFTUNG, OF HERZOGENRATH, GERMANY.

METHOD OF AND APPARATUS FOR CUTTING PLATE-GLASS.

1,114,098.   Specification of Letters Patent.   Patented Oct. 20, 1914.

Application filed July 25, 1912. Serial No. 711.439.

*To all whom it may concern:*

Be it known that I, MAX BICHEROUX, a subject of the King of Belgium, residing at Herzogenrath, Rheinland, Germany, have invented a new and useful Method of and Apparatus for Cutting Plate-Glass, of which the following is a specification.

In the manufacture of raw plate glass, the pouring table is preferably composed of a number of small tables having spaces between them so that they can expand freely. The plate glass is divided into a number of units, during the rolling operation each of which on account of its small size can easily be handled, thus overcoming the difficulty of handling large plates and the danger of the plate cracking or swelling.

The object of the present invention is to provide a suitable and efficient apparatus for cutting the plate glass into said units. It has been found that the best way of cutting the glass is by means of shears one blade of which is formed by the edge of a pouring table. This arrangement has the following advantages over cutting blades or rollers acting against the surfaces of the tables: The cutting is effected in the shortest possible time. The cut edge of the glass coincides with the edge of the table which makes an exceedingly clean cut. Both these conditions are very important for operating successfully.

In the accompanying drawings, some modifications of the cutting device are illustrated.

Figure 1:
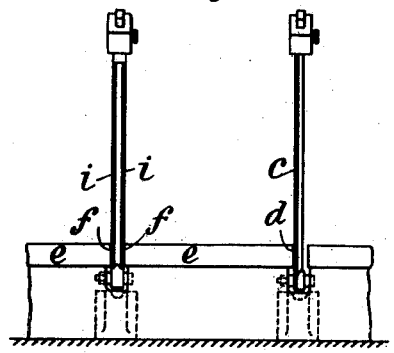
Figure 2:
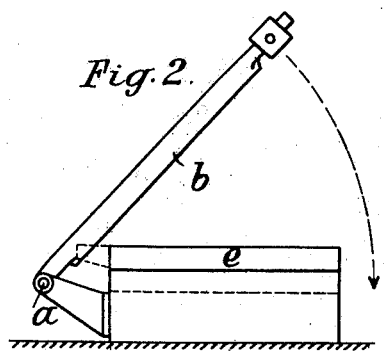
Figure 3:
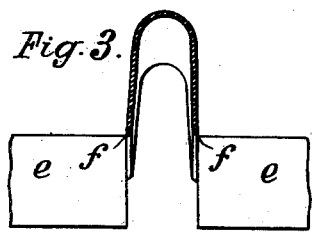
Figure 6:
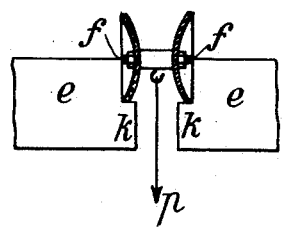
Figure 4:
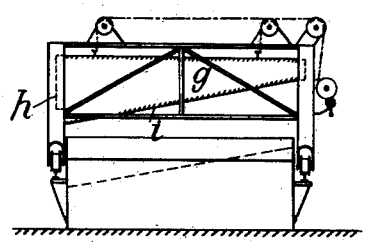
Figure 5:
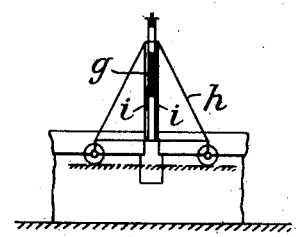

Figures 1 and 2 illustrate an apparatus in which the movable shearing blade is adapted to turn on a pivot. Fig. 3 is a cross-section of the blade. Figs. 4 and 5 illustrate a modification in which the blade is adapted to slide in parallel guides, and Fig. 6 illustrates a further modification having cutting rollers instead of blades.

Referring to Figs. 1 to 3 $e$, $e$ are adjacent pouring tables between which open spaces are left. The blades are arranged opposite these open spaces and adapted to turn on pivots $a$. The blade at the right hand side of Fig. 1 has a single cutting edge $c$, which when the blade is lowered as indicated by the arrow in Fig. 2 moves along the edge $d$ of the adjacent table $e$, thus cutting the glass. The blade to the left of Fig. 1 is bent double so as to resemble a horse-shoe in cross-section, see Fig. 3, and has two cutting edges $i$, $i$ which on operation of the blade move along the edges $f$, $f$ of two adjacent tables $e$. The blade is preferably so constructed that its edges when disengaged from the space between the tables are at a distance slightly greater than the width of said space, so that when the blade is lowered they exert pressure on the edges of the tables. This construction of the blade has the advantages of performing two cuts at a time, and leaving the severed portions well separated so that one may be moved without disturbing its neighbor, of making a very clean cut and of giving the blade itself greater strength.

In Figs. 4 and 5, the blade instead of being pivoted, is adapted to move vertically, its ends being guided in parallel uprights $h$. This blade also has two edges $i$, $i$. A blade may be arranged in fixed uprights above every space between the tables $e$, but preferably, as indicated in Figs. 4 and 5, the uprights may be adapted to be displaced on rails or the like so as to enable them to be moved from space to space.

The blades may be replaced by cutting rollers. In Fig. 6, two cutting rollers arranged on a common shaft are illustrated. This construction is preferred as it has the same advantages as the double-edged blade. The cutting rollers move on projections $k$, $k$ at the edges of tables $e$ and exert a slight pressure on said edges. The apparatus is preferably displaced along said edges by means of a handle (not shown). As a rule it will be necessary to load the apparatus, as indicated by arrow $p$.

I claim:

1. The method of separating plastic sheets of plate glass into successive portions each wholly free from adjacent portions which consists in cutting out and removing a narrow waste strip between said successive portions.

2. In apparatus for cutting plastic plate glass, the combination with a plane pouring table divided transversely into spaced sections having substantially parallel cutting edges adjacent to the intervening spaces, of movable cutting devices having two shearing edges in position to coact with said edges, respectively, to cut from a plastic glass sheet a strip substantially equal in width to the space between consecutive table sections.

3. In apparatus for cutting plastic plate glass, the combination with pouring tables spaced apart in the same plane, or rotary cutting devices arranged to traverse the space between consecutive tables and sever glass thereon along the margins of both adjacent tables.

4. In apparatus of the class described, the combination with two spaced pouring tables fixed in the same plane, having cutting margins adjacent to the space between them, and provided on their opposing edge faces with projecting shoulders parallel to the face of the table, of shearing rollers arranged to move along said margins, respectively, in cutting relation with the same and with the corresponding shoulders.

5. In apparatus of the class described, the combination with spaced pouring tables fixed in the same plane and having parallel cutting edges next the spaces between them, of a pair of cutting rollers mounted on the same shaft and arranged to advance between consecutive tables while making shearing contact with the margin of each, whereby a narrow strip of glass upon the table may be cut out, leaving spaced body portions of the glass.

6. In apparatus of the class described, the combination with spaced pouring tables fixed in the same plane and having cutting edges next the space between them, of a pair of oppositely turned outwardly concave rotating cutting disks working between and coacting with said edges and having their own working edges normally slightly more distant from each other than are the edges with which they co-act.

MAX BICHEROUX.

Witnesses:
 ALBERT MASON,
 HENRY QUADFLIEG.